(No Model.)
J. WADE.
CUTTER FOR CORN HARVESTERS.
No. 424,522.  Patented Apr. 1, 1890.
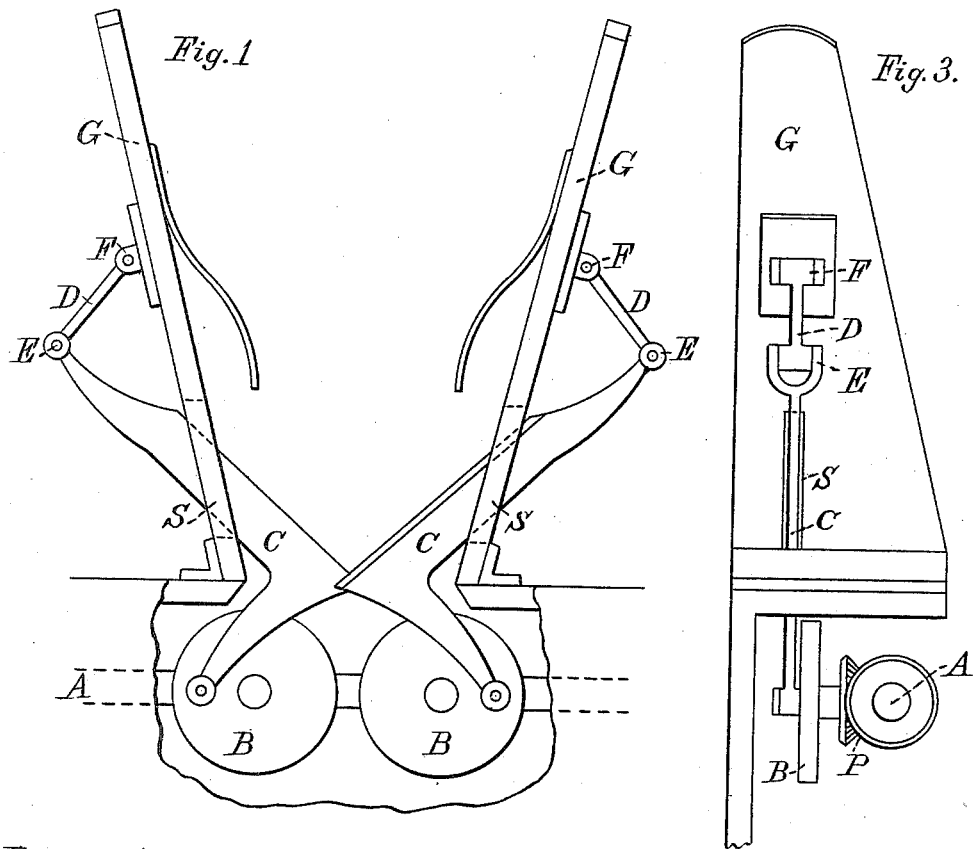
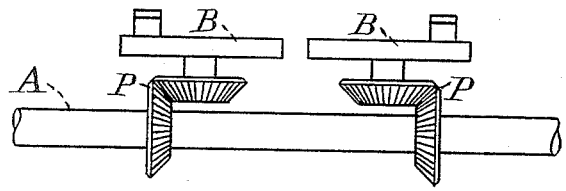
Witnesses
Frank Landis
Inventor
John Wade
By his Attorneys Smith & Shinn

UNITED STATES PATENT OFFICE.

JOHN WADE, OF WAUPUN, WISCONSIN.

CUTTER FOR CORN-HARVESTERS.

SPECIFICATION forming part of Letters Patent No. 424,522, dated April 1, 1890.

Application filed May 27, 1889. Serial No. 312,240. (No model.)

*To all whom it may concern:*

Be it known that I, JOHN WADE, a citizen of the United States, residing at Waupun, in the county of Dodge and State of Wisconsin, have invented a new and useful Improvement in Cutters for Corn-Harvesters, of which the following is a specification.

This invention relates to an improvement in cutters for corn-harvesters in which two or more knives are operated in conjunction with cranks and by means of power conveyed from a driving-wheel, and the object is to facilitate the cutting of corn by other power than hand labor, which object I attain by means of the mechanism hereinafter more particularly described, reference being had to the accompanying drawings, making part of this specification, in which—

Figure 1 is a horizontal view of the cutter as seen when standing over it. Fig. 2 is a perpendicular view from the rear, showing the working of the shaft, pinions, and crank-wheels. Fig. 3 is a perpendicular view of the side, showing the working of the knife through the guard.

Like letters refer to like parts in each of the several drawings.

A is the shaft, communicating the motion from the drive-wheel of the harvester to the cutter.

B B are crank-wheels giving motion to the knives C C, which motion is aided by the arms D D, the elbow-joints E E, the shoulder-joints F F, and the slots S S in the guards G G.

The practical working of my invention is as follows: As the harvester is moving forward the shaft A is turned by a gearing with the driving-wheel, the crank-wheels B B are turned, one to the right and the other to the left, by the geared pinions P P, and a shear-like motion given to the knives C C, which knives are provided with left and right beveled edges to facilitate their cutting. The forward-and-backward motion consequent upon the revolution of the crank-wheels B B is permitted by the elbows E E, the arms D D, and the shoulder-joints F F. The edges of the knives are kept in contact with each other by means of the slots S S in the guards G G and the construction of the elbow-joints E E and the shoulder-joints F F.

It will be noticed that when the knives close together, while the cranks have a backward motion on the circle which they describe, the knives C C will have the same backward motion, which motion will counteract the forward motion of the harvester and enable the knives to close in squarely against the stalk of corn to be cut, thus preventing a dragging down of the stalk.

What I claim as my invention, and desire secured by Letters Patent, is—

In a corn-harvester or the like, the combination of guards G G, shear-blades C C, a rotary shaft A, and cranks B B, connected with and turned in opposite directions by the shaft A, the said blades being respectively connected with the cranks and each being linked from its upper end to the guard G, substantially as and for the purpose set forth.

JOHN WADE.

Witnesses:
W. B. POPE,
W. H. COZZENS.